3,453,140
Patented July 1, 1969

3,453,140
REFRACTORY SHAPES COATED WITH ORGANIC
MATERIAL
Ernest P. Weaver, Pittsburgh, Pa., assignor to Dresser
Industries, Inc., a corporation of Delaware
No Drawing. Continuation-in-part of application Ser. No.
535,341, Mar. 18, 1966. This application Mar. 23, 1966,
Ser. No. 536,640
Int. Cl. C09d 3/74; C03c 25/02
U.S. Cl. 117—113                                                     9 Claims

ABSTRACT OF THE DISCLOSURE

A refractory shape containing a carbonaceous material coated with a film formed from a mixture of wax and a vinyl-type resin.

---

This invention relates to coated, tar-containing refractory shapes, and more particularly to basic, tar-containing refractory brick coated with a cokeable carbonaceous material.

This application is a continuation-in-part of application Ser. No. 535,341 filed Mar. 18, 1966 for Coated Refractory Shapes.

Various types of refractories are in common use for such purposes as the construction or lining of furnaces which are operated at high temperatures. Commercially, the refractory materials are supplied as unconsolidated aggregate and as formed shapes. The refractories most commonly used may generally be classified in a few main groups known, for example, as fireclay, high-alumina, silica, basic etc. Basic refractories are used in large volume in the production of steel. Those commonly used include dead burned magnesite (magnesia MgO), dead burned dolomite (CaO·MgO) and hard burned lime, and combinations of the same. These materials may be provided as chemically bonded unburned shapes, usually tar bonded, or ceramically bonded tar impregnated shapes. Refractories of the other groups may be supplied in like manner, for example, tar bonded or tar impregnated high alumina refractories.

Tar-containing refractory shapes usually include such a material to provide a bond for the refractory grains which make up the shapes and/or to aid in inhibiting hydration, particularly with such as dead burned dolomite which includes free lime (CaO which is not stabilized or reacted by the addition of such as silica, iron oxide and the like). The pitch or tar, also, contributes to the ability of the refractory to resist chemical attack by molten slag. The tar or pitch or other nonaqueous, cokeable, carbonaceous material, on heating, decomposes and resultant carbon is deposited within the pores and around brick grains. Unfortunately, use of tar, pitch or other carbonaceous material does not completely prevent hydration. Further, some of various carbonaceous materials evolve organic volatiles which may cause irritation of the epidermis of workers having sensitive skin.

According to one concept of the present invention refractory shapes containing at least some free lime are coated to provide a substantially impervious skin or coating to seal in residual volatiles in the tar, pitch or other non-aqueous, cokeable carbonaceous material and to prevent absorption of moisture in the shapes, further reducing hydration of refractory materials. In another concept, a basic refractory shape having incorporated tar, pitch or other non-aqueous cokeable carbonaceous material, is coated with an organic material which is solid at ambient temperatures and provides a barrier against moisture penetration, while at the same time preventing release of volatile organic material from the shape. Of course, preventing release of organic volatiles reduces danger of irritating sensitive workers handling the shape.

Preferably, the organic coating is a synthetic organic resin of the type: polyvinyl or polyvinylidene chloride and/or acetate, and copolymers of such with vinyl chlorides (herein referred to as vinyl type resins) compatible in and dispersed throughout a paraffin wax or a similar wax material. The coating must be tough enough to withstand handling in shipping, storage and in the actual construction of furnace elements. It must, also, not be too viscous during the coating procedure in order to permit forming of a good coating.

It is, therefore, included among the objects and advantages of this invention to provide a refractory shape having incorporated therein a non-aqueous cokeable carbonaceous material with a substantially moisture-proof coating which coating also prevents release of volatile organic materials from said shape.

A further object of the invention is to provide a method of coating refractory shapes containing non-aqueous cokeable carbonaceous material, to produce a uniform, continuous coating over exposed surfaces of said shapes.

A still further object of the invention is to provide coated basic refractory shapes which have incorporated therein a non-aqueous cokeable carbonaceous material, which coating is a tough, continuous coating over exposed surfaces of such shapes providing a moisture barrier against external moisture and a barrier to the release of volatile organic materials from the shapes during handling.

Another object of the invention is to provide a coating for refractory shapes which is comprised of a wax and a vinyl type synthetic organic resin.

Further objects and advantages will be apparent from the following description and illustrative examples which are not intended to limit the spirit or scope of the invention but are intended to demonstrate the invention.

Refractory shapes, particularly brick, are not made of a homogeneous mass of refractory particles. Such shapes are made of mixtures of size graded particles, i.e., some coarse and some fine. The use of size graded materials produces a dense pack of particles, but it, also, produces a rough surface because of the slightly protruding coarse particles, and the fine particles cannot fill all the voids and depressions on the surface. Thus, the invention provides a coating for such surfaces.

Basic refractory shapes with non-aqueous, cokeable carbonaceous material incorporated therein which may be used in the present invention may be made by known techniques. Among many others, in U.S. Patent No. 3,233,017 issued Feb. 1, 1966, to the present assignee, and U.S. Patent No. 3,215,546 issued Nov. 2, 1965, to the present assignee, there are described methods of making tar or pitch-bonded refractory shapes which are useful for the present invention. However, the invention is useful for coating refractory shapes made by other methods, for example, ceramically bonding the shapes by firing to an elevated temperature and then impregnating them with pitch, tar or other like non-aqueous cokeable carbonaceous material.

Example I

In one series of tests, dolomite or high lime brick were prepared and tested with several coatings, as set out below. A number of brick were prepared in accordance with the previously mentioned U.S. Patent No. 3,233,017. As is well known in the art, dead burned dolomite hydrates quite readily in the presence of moisture since it includes free lime. The shapes made in accordance with said patent include size graded refractory grain and non-aqueous, cokeable carbonaceous bonding materials. For example, size graded dolomite grain (of a screen analysis: 30% minus 4 plus 10 mish, 30% minus 10 plus 28 mesh, with the remainder minus 28 mesh and including about 30% ball mill fines) was mixed with pitch. The mixed refractory grain and pitch were heated to about 240° F. and then formed into shapes in a press at 8000 p.s.i. The shapes were then heated to about 400° F. in a desiccated atmosphere and maintained for 13 to 16 hours. After removal and cooling, the shapes were coated with the indicated materials.

The coating material for Test I was made by heating in the range of 300 to 350° F. about 70% paraffin and 30% of Elvax 260, the brand name of a high molecular weight ethylene vinyl acetate copolymer sold by E. I. du Pont de Nemours & Co., Wilmington, Del. Brick made of the above refractory materials were warmed to 200 to 300° F. and immersed into the molten mixture for about a minute. In Test 2, the brick were wrapped in Saran-wrap which is a flexible plastic film consisting of a copolymer of vinylidene chloride with vinyl chloride marketed by Dow Chemical Company, Midland, Mich. In Test 3, paraffin alone was used. The brick were then stored in a humidity cabinet at 90° F. and 85% relative humidity. The effect on the bricks is set out in the table.

TABLE

| Test No. | Coating | Time, and effect on brick |
|---|---|---|
| 1 | Paraffin & Elvax 260 | 8 days; hydrated. |
| 2 | Saran-wrap | 4 days; hydrated. |
| 3 | Paraffin | Do. |
| 4 | Untreated | 2 days; hydrated. |

This testing clearly showed the superiority of the practices of the present invention over straight paraffin or a preformed sheet or film in which the brick are later wrapped.

Example II

In another series of tests, a batch of brick were made in accordance with U.S. Patent No. 3,141,790 and coated with the same materials. Such bricks were tar impregnated, ceramically bonded dead burned magnesite refractory shapes containing up to about 97% MgO, with CaO and $SiO_2$ present in a weight ratio of 3 or 4 to 1 with not more than 1% $Cr_2O_3$, $Al_2O_3$ or $Fe_2O_3$. The magnesite used to make the brick was graded to provide about 40% minus 4 on 10 mesh, about 15% minus 10 on 28 mesh, about 15% minus 28 on 65 mesh, and about 30% minus 65 mesh and fines. For this type of brick, which is much more hydration resistant than the free lime-containing dolomite ones discussed above, the coating is primarily to prevent evolution of organic volatiles from the impregnating material.

The coating material is, of course, organic and burnable. It should not have ingredients which make noxious odors during storage or construction in confined places. The coating may be applied by spraying, in some instances as a hot spray, brushing or dipping. The resin and wax mixture should have a fast "set" time for economy of production. Paraffin wax is a good carrier for the vinyl-type resin and the mixture provides a good barrier to moisture and organic vapors.

Usually the paraffin wax is the major ingredient of the mixture, on the order of 50 to 80%; however, the amount depends on the particular vinyl-type resin, enough being present to form a tough film and still provide a sufficiently fluid mix to uniformly provide a continuous coating. The vinyl-type resins include vinyl chlorides, vinylidene acetates and/or copolymers with the chlorides, generally called vinyl-type resins. These are relatively high molecular weight compounds of the addition-type polymers. These generally melt in the range of 230 to 300° F.

Elvax 260 has been specifically mentioned above and is the preferred embodiment. Other usable polymers include Elvax 210 and 240. The vinyl-type resins have a melting point in the melting range of the paraffin wax and are completely miscible, when fluid, with the melted wax.

Other waxes may be used; however, for economy, the paraffin wax is preferable.

The wax and organic resin coating provides a very smooth covering on the brick, and the coating in the preferred thickness of from 1/32 inch to 1/16 inch thick seems to be elastic to fingernail pressure. In some cases, when a brick has been coated, some matte appearing areas may be present. The areas appear dull and dry instead of shiny (as it is when the desired thickness of coating is present). These dry areas indicate material has been locally absorbed into the brick and further treatment is necessary to provide the uniform coating desired.

The coating, in one aspect of the invention, may be preformed by dipping or immersing a refractory shape in a liquid mixture of a wax and an organic resin. Preferably, the wax (generally paraffin wax) is mixed with the organic resin and the mixture heated to from 300 to 400° F. The brick are heated to 200 to 300° F. prior to immersing to prevent freezing of the mixture as cold brick touch it, thereby failing to form a uniform coating. The heated brick are retained in the fluid for about a minute and then withdrawn and permitted to cool. If the brick are too hot, they tend to drive off the paraffin or even ignite it. The exact temperature range for each mixture of wax and vinyl-type resin must be determined on the basis of amount of wax present to the resin and on the physical characteristics of the resins. The amount of time of the immersion in the wax-resin mixture is determined by the time necessary for the brick to adbsorb the mixture and fill the surface pores so as to produce a smooth, continuous film. A time on the order of one minute is satisfactory for most mixtures of paraffin wax and organic resin, where the amount of paraffin wax is in the range of 50 to 80%.

When coated according to the invention, the refractory shapes have a good shelf or storage life, with minimum hydration. The evolved organic volatiles are reduced below the point which causes reactions to the majority of organic-material sensitive people. The brick and covering are stable during handling and construction. Unless otherwise stated, all sizes grading is by Tyler mesh screen sizes and percentages are by weight. The foregoing discussion primarily has been concerned with tar-containing refractories. The invention is also applicable to free-lime containing brick which do not include tar. For example, burned dolomite brick. In such a situation, the coating is strictly a hydration preventive.

Having thus described the invention in detail and with sufficient particularity to enable those skilled in the art to practice it, what is desired to have protected by Letters Patent is set forth in the following claims.

I claim:
1. A refractory shape of refractory grains and a non-aqueous cokeable carbonaceous material which has been decomposed by heating and which releases organic vapors; a thin, continuous film coating said shape and sealing the exposed surfaces of said shape from penetration by water vapor and from release of organic vapors from said shape; said coating being a mixture of from about 50 to about 80 weight percent of wax, the remainder comprising substantially at least one vinyl resin formed from at least one of vinyl chloride, vinylidene chloride, vinyl acetate, and vinylidene acetate; said coating being characterized by being thermoplastic substantially above ambient temperatures and solid at ambient temperatures; said coating additionally being characterized by a continuous smooth surface which is elastic to fingernail pressure.

2. A refractory shape according to claim 1 in which said refractory includes free-lime containing basic refractory grain.

3. A refractory shape according to claim 1 in which said coating includes paraffin wax.

4. A refractory shape according to claim 3 in which said coating includes a high molecular weight ethylene-vinyl acetate copolymer.

5. A refractory shape according to claim 3 in which said coating includes a copolymer of vinylidene chloride and vinyl chloride.

6. A refractory shape according to claim 1 in which the coating is a mixture of about 70% paraffin wax and about 30%, by weight, of the vinyl resin.

7. The method of coating a refractory shape containing a nonaqueous cokeable carbonaceous material which has been decomposed by heating and which releases organic vapors, the method comprising heating a mixture of from about 50 to about 80 weight percent of wax, the remainder being substantially at least one vinyl resin formed from at least one of vinyl chloride, vinylidene chloride, vinyl acetate, and vinylidene acetate; the heating being to a temperature in the range 300 to 350° F. where said mixture is fluid; heating said refractory shape to a temperature in the range about 200 to 300° F.; submerging said heated shape in said fluid for a sufficient time to fill surface pores and coat said shape with a thin, continuous film over exposed surfaces thereof; and removing said shape from said fluid and permitting the temperature of the coated shape to lessen so as to solidify said film.

8. A method according to claim 7 in which a basic refractory is coated.

9. A method according to claim 7 in which the wax is paraffin wax and the shapes are immersed in the mixture for about one minute.

References Cited

UNITED STATES PATENTS

| | | |
|---|---|---|
| 2,893,888 | 7/1959 | Yarotsky. |
| 3,015,850 | 1/1962 | Rusoff et al. |
| 3,207,716 | 9/1965 | Lippoldt. _____ 260—28.5 X |

RALPH S. KENDALL, *Primary Examiner.*

C. R. WILSON, *Assistant Examiner.*

U.S. Cl. X.R.

117—123, 161